United States Patent
Feng et al.

(10) Patent No.: US 12,315,130 B2
(45) Date of Patent: May 27, 2025

(54) METHOD AND SYSTEM FOR MONITORING RICE BACTERIAL BLIGHT IN FIELD BASED ON MULTI-SOURCE DATA

(71) Applicant: Zhejiang University, Zhejiang (CN)

(72) Inventors: Xuping Feng, Hangzhou (CN); Xiulin Bai, Hangzhou (CN); Yong He, Hangzhou (CN); Jinnuo Zhang, Hangzhou (CN); Mingzhu Tao, Hangzhou (CN); Qingguan Wu, Hangzhou (CN)

(73) Assignee: Zhejiang University, Hangzhou (CN)

( * ) Notice: Subject to any disclaimer, the term of this patent is extended or adjusted under 35 U.S.C. 154(b) by 374 days.

(21) Appl. No.: 18/157,972

(22) Filed: Jan. 23, 2023

(65) Prior Publication Data
US 2023/0410280 A1    Dec. 21, 2023

(30) Foreign Application Priority Data
May 31, 2022    (CN) .......................... 202210608339.4

(51) Int. Cl.
  *G06T 7/00*    (2017.01)
  *A01G 22/22*   (2018.01)
  (Continued)

(52) U.S. Cl.
  CPC ............ *G06T 7/0004* (2013.01); *A01G 22/22* (2018.02); *B64U 20/87* (2023.01); *G06T 3/4038* (2013.01);
  (Continued)

(58) Field of Classification Search
  CPC ............ A01G 22/22; A01D 2033/005; G06T 7/0004; G06T 3/4038; G06T 2207/10036;
  (Continued)

(56) References Cited

U.S. PATENT DOCUMENTS

2023/0384231 A1*  11/2023  He ..................... G01N 33/0098

OTHER PUBLICATIONS

Caasi, Oliver Cahiga. "The application of remote sensing technology to estimate the severity of bacterial leaf bright on rice." Disertasi. Chiba University pp. 1-79. (Year: 2020).*

(Continued)

*Primary Examiner* — Henok Shiferaw
*Assistant Examiner* — Johanna Mabba Dingle
(74) *Attorney, Agent, or Firm* — McDonnell Boehnen Hulbert & Berghoff, LLP

(57) ABSTRACT

A method for monitoring rice bacterial blight includes: obtaining a multi-spectral image, severities of the rice bacterial blight, and accumulated temperature data of a rice field at different growth stages; obtaining resistance of rice varieties to the bacterial blight; extracting a mean canopy spectral reflectance of each plot in the rice field; conducting regression of the severity of the rice bacterial blight using a convolutional neural network based on the mean canopy spectral reflectance and the severity of the rice bacterial blight, and outputting a depth spectrum feature; training a disease severity regression model with the accumulated temperature data, the depth spectrum feature, and the resistance to the bacterial blight for each plot as an input and the corresponding severity as an output; and monitoring a severity of the rice bacterial blight in a to-be-monitored rice field using the disease severity regression model.

10 Claims, 5 Drawing Sheets

(51) Int. Cl.
*B64U 20/87* (2023.01)
*G06T 3/4038* (2024.01)
*B64U 101/30* (2023.01)
*B64U 101/40* (2023.01)

(52) U.S. Cl.
CPC ...... *B64U 2101/30* (2023.01); *B64U 2101/40* (2023.01); *G06T 2207/10036* (2013.01); *G06T 2207/20084* (2013.01); *G06T 2207/30128* (2013.01)

(58) Field of Classification Search
CPC . G06T 2207/20084; G06T 2207/30128; G06T 2207/30188; G06T 3/4046; G06T 7/0002; G06T 7/136; G06T 7/194; G06T 2207/20081; B64U 2101/30; B64U 2101/40; A01P 1/00; Y02A 40/10; G01N 21/84; G01N 21/55; G01N 2021/8466; G01S 17/89; G06N 3/045; G06N 3/08
See application file for complete search history.

(56) References Cited

OTHER PUBLICATIONS

Feng, Ziheng, et al. "Moitoring wheat powdery mildew based on hyperspectral, thermal infrared, and RGB image data fusion" Sensors 22.1 pp. 1-19. (Year: 2021).*

Franceschini, Marston Héracles Domingues. Crop traits retrieval and disease detection in potato: UAV optical sensing for plant monitoring. Diss. Wageningen University and Research, pp. 1-164. (Year: 2021).*

Zhang, Jinnuo, et al. "Rice bacterial blight resistant cultivar selection based on visible/near-infrared spectrum and deep learning." Plant Methods 18.1 pp. 1-16. (Year: 2022).*

Chivasa, Walter, et al. "UAV-based high-throughput phenotyping to increase prediction and selection accuracy in maize varieties under artificial MSV inoculation." Computers and Electronics in Agriculture pp. 1-14 (Year: 2021).*

Su, Jinya, et al. "Wheat yellow rust monitoring by learning from multispectral UAV aerial imagery." Computers and electronics in agriculture pp. 157-166. (Year: 2018).*

* cited by examiner

Real disease severity in field

METHOD AND SYSTEM FOR MONITORING RICE BACTERIAL BLIGHT IN FIELD BASED ON MULTI-SOURCE DATA

CROSS REFERENCE TO RELATED APPLICATION

This patent application claims the benefit and priority of Chinese Patent Application No. 202210608339.4 filed with the China National Intellectual Property Administration on May 31, 2022, the disclosure of which is incorporated by reference herein in its entirety as part of the present application.

TECHNICAL FIELD

The present disclosure relates to the field of crop disease monitoring, and in particular, to a method and system for monitoring rice bacterial blight in a field based on multi-source data.

BACKGROUND

Rice suffers from the invasion of pests and diseases during growth, resulting in irreversible yield reduction and economic loss. The bacterial blight is one of the typical diseases affecting the growth of rice, which mainly causes leaf withering and affects the photosynthesis and nutrient transport of rice, causing yield reduction. In the field, the occurrence of bacterial blight may reduce the yield of rice by 10%-20%, no less than 50% in severe cases, or even cause total crop failure, which seriously threats the safety production of rice.

At present, the rice bacterial blight is mainly prevented by chemical control. Long-term use of chemicals not only makes pathogens resistant, but also causes environmental pollution. In addition, for the rice in a field, the incidence of rice often requires on-the-spot investigation by plant protection personnel, which is time-consuming and laborious and is affected by human subjective judgment and the environment. It is of great significance for rice field management and disease control to monitor the disease situation in time and grasp the disease severity.

In recent years, the unmanned aerial vehicle (UAV) remote sensing technology has developed rapidly. The technology has the advantages of strong flexibility, real-time data acquisition, and cost-effectiveness, and a multi-spectral camera carried by the UAV provides support for the detection and quantification of crop diseases in the field. Su et al. develop a wheat yellow rust monitoring system applicable to field scale using the five-channel multispectral camera carried by the UAV, and the mean accuracy of identifying healthy and susceptible wheat reaches 89.2%. Chivasa et al. conduct phenotypic analysis on the response of maize varieties to maize streak virus (MSV) diseases based on the multi-spectral data obtained by the UAV, and the phenotypic correlation data obtained from the spectral data at different growth stages has a significant correlation with the score of artificial MSV diseases (r=0.74-0.84).

From the practical situation, phenotypic evaluation models applicable to different growth stages are different. At present, there is a lack of a universal method for monitoring diseases across different growth stages.

SUMMARY

An objective of the present disclosure is to provide a method and system for monitoring rice bacterial blight in a field based on multi-source data, which achieves rapid monitoring of bacterial blight resistance of a rice in the field at different growth stages.

To achieve the above objective, the present disclosure provides the following technical solutions:

A method for monitoring rice bacterial blight in afield based on multi-source data includes:
  obtaining a multi-spectral image of a rice field at different growth stages;
  obtaining severities of the rice bacterial blight and accumulated temperature data in the rice field at different growth stages;
  obtaining resistance of rice varieties planted in the rice field to the bacterial blight;
  extracting a mean canopy spectral reflectance of each plot in the rice field based on the multi-spectral image, where the rice field is divided into a plurality of plots;
  conducting regression of the severity of the rice bacterial blight using a convolutional neural network based on the mean canopy spectral reflectance and the severity of the rice bacterial blight for each plot, and outputting a depth spectrum feature;
  training a disease severity regression model with the accumulated temperature data, the depth spectrum feature, and the resistance to the bacterial blight for each plot as an input and the corresponding severity of the rice bacterial blight as an output to obtain a well-trained disease severity regression model; and
  monitoring a severity of the rice bacterial blight in a to-be-monitored rice field by using the well-trained disease severity regression model.

Optionally, the method for monitoring rice bacterial blight in afield based on multi-source data further includes:
  outputting an optimal band combination using an attention mechanism module in the convolutional neural network, where the optimal band combination is a combination of wavelengths corresponding to first N terms in a sequence obtained by sorting wavelength weights outputted by the attention mechanism module from large to small;
  constructing a monitoring spectral index (SI) of the rice bacterial blight according to the optimal band combination; and
  obtaining a monitoring SI of the rice bacterial blight in the to-be-monitored rice field, and mapping the monitoring SI of the rice bacterial blight in the to-be-monitored rice field into the multi-spectral image to obtain a visual image of the severity of the rice bacterial blight in the to-be-monitored rice field.

Optionally, the obtaining multi-spectral image of a rice field at different growth stages includes:
  obtaining remote sensing images of the rice field at different growth stages by an UAV equipped with a multi-spectral camera; and
  stitching a plurality of the remote sensing images to obtain the multi-spectral image of the rice field as a whole.

Optionally, the obtaining severities of the rice bacterial blight and accumulated temperature data in the rice field at different growth stages includes:
  determining the severity of the rice bacterial blight in each plot according to a proportion of an incidence area of the rice bacterial blight in a total area of each plot; and
  recording maximum and minimum temperatures of each plot on a day when the multi-spectral image is obtained, and calculating the accumulated temperature data of each plot through an accumulated temperature formula.

Optionally, the extracting a mean canopy spectral reflectance of each plot in the rice field based on the multi-spectral image includes:

removing a background of the multi-spectral image of the rice field using a threshold segmentation method; and
extracting the mean canopy spectral reflectance of each plot from the multi-spectral image with the background removed.

Optionally, the disease severity regression model is a partial least square regression (PLSR) model.

The present disclosure further discloses a system for monitoring rice bacterial blight in a field based on multi-source data, including:

a multi-spectral image obtaining module, configured to obtain a multi-spectral image of a rice field at different growth stages;
a bacterial blight severity and accumulated temperature data obtaining module, configured to obtain severities of the rice bacterial blight and accumulated temperature data in the rice field at different growth stages;
a bacterial blight resistance of rice varieties obtaining module, configured to obtain resistance of the rice varieties planted in the rice field to the bacterial blight;
a mean canopy spectral reflectance extraction module, configured to extract a mean canopy spectral reflectance of each plot in the rice field based on the multi-spectral images, where the rice field is divided into a plurality of plots;
a depth spectrum feature output module, configured to conduct regression of the severity of the rice bacterial blight using a convolutional neural network based on the mean canopy spectral reflectance and the severity of the rice bacterial blight for each plot, and output a depth spectrum feature;
a disease severity regression model training module configured to train a disease severity regression model with the accumulated temperature data, the depth spectrum feature, and the resistance to the bacterial blight for each plot as an input and the corresponding severity of the rice bacterial blight as an output to obtain a well-trained disease severity regression model; and
a disease severity monitoring module, configured to monitor a severity of the rice bacterial blight in a to-be-monitored rice field by using the well-trained disease severity regression model.

Optionally, the system for monitoring rice bacterial blight in a field based on multi-source data further includes:

an optimal band combination determination module, configured to output an optimal band combination using an attention mechanism module in the convolutional neural network, where the optimal band combination is a combination of wavelengths corresponding to first N terms in a sequence obtained by sorting wavelength weights outputted by the attention mechanism module from large to small;
a rice bacterial blight monitoring SI construction module, configured to construct a monitoring SI of the rice bacterial blight according to the optimal band combination; and
a visual image determination module for the severity of the rice bacterial blight, configured to obtain a monitoring SI of the rice bacterial blight in the to-be-monitored rice field, and map the monitoring SI of the rice bacterial blight in the to-be-monitored rice field into the multi-spectral image to obtain a visual image of the severity of the rice bacterial blight in the to-be-monitored rice field.

Optionally, the multi-spectral image obtaining module includes:

a remote sensing image obtaining unit, configured to obtain remote sensing images of the rice field at different growth stages by an UAV equipped with a multi-spectral camera; and
an image stitching unit, configured to stitch a plurality of the remote sensing images to obtain the multi-spectral image of the rice field as a whole.

Optionally, the bacterial blight severity and accumulated temperature data obtaining module includes:

a bacterial blight severity determination unit, configured to determine the severity of the rice bacterial blight in each plot according to a proportion of an incidence area of the rice bacterial blight in a total area of each plot; and
an accumulated temperature data determination unit, configured to record maximum and minimum temperatures of each plot on a day when the multi-spectral image is obtained, and calculate the accumulated temperature data of each plot through an accumulated temperature formula.

According to the specific examples provided by the present disclosure, the present disclosure discloses the following technical effects:

The present disclosure discloses a method and system for monitoring rice bacterial blight in a field based on multi-source data, so as to monitor the rice bacterial blight across different growth stages based on fusion of multi-spectral data, field accumulated temperature data, and resistance information of rice varieties to bacterial blight, which is conducive to improving the reliability of disease monitoring.

BRIEF DESCRIPTION OF THE DRAWINGS

To describe the technical solutions in the examples of the present disclosure or in the prior art more clearly, the accompanying drawings required for the examples are briefly described below. Apparently, the accompanying drawings in the following description show merely some examples of the present disclosure, and those of ordinary skill in the art may still derive other accompanying drawings from these accompanying drawings without creative efforts.

DETAILED DESCRIPTION OF THE EMBODIMENTS

The technical solutions of the embodiments of the present disclosure are clearly and completely described below with reference to the accompanying drawings. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

An objective of the embodiments is to provide a method and system for monitoring rice bacterial blight in a field based on multi-source data, which achieves rapid monitoring of bacterial blight resistance of a rice in the field at different growth stages.

To make the above-mentioned objective, features, and advantages of the present disclosure clearer and more comprehensible, the present disclosure will be further described in detail below in conjunction with the accompanying drawings and specific embodiments.

Embodiment I

Figure 1:
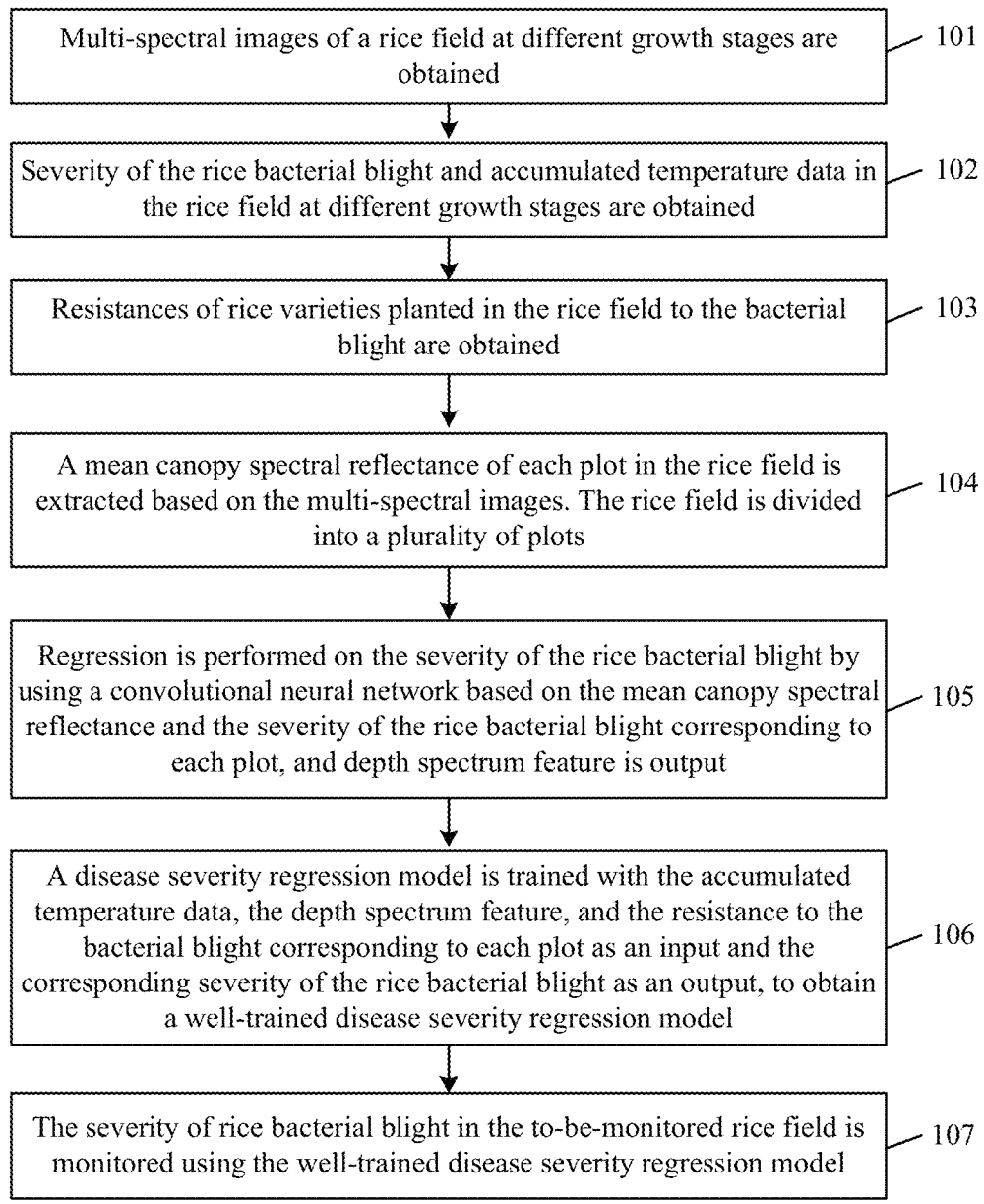
FIG. 1 is a flow diagram I of a method for monitoring rice bacterial blight in a field based on multi-source data according to the present disclosure.
Figure 2:
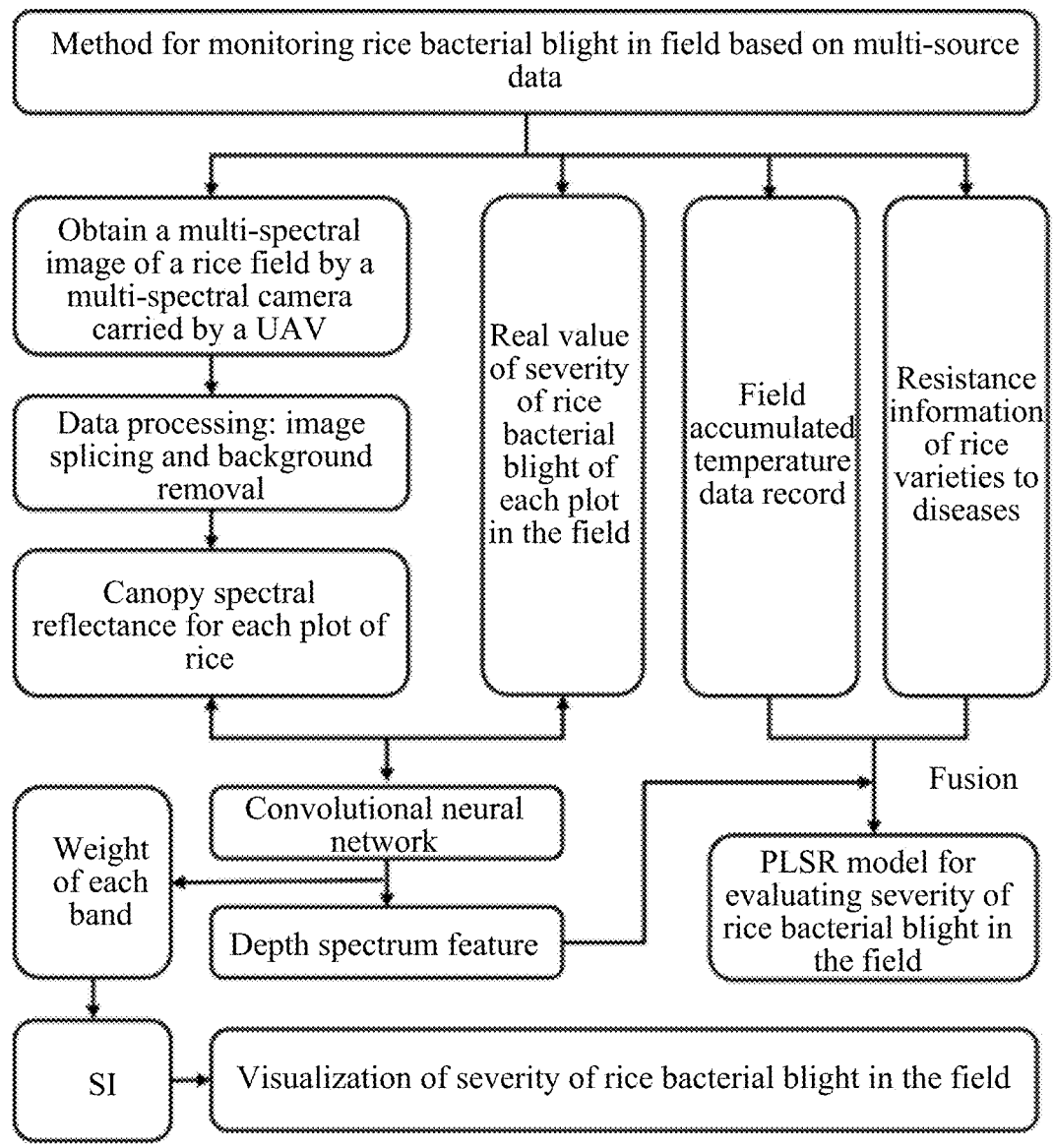
FIG. 2 is a flow diagram II of the method for monitoring the rice bacterial blight in the field based on the multi-source data according to the present disclosure.

FIG. 1 is a flow diagram I of a method for monitoring rice bacterial blight in a field based on multi-source data of the present disclosure. FIG. 2 is a flow diagram II of the method for monitoring the rice bacterial blight in the field based on the multi-source data of the present disclosure. As shown in FIGS. 1-2, the method for monitoring the rice bacterial blight in the field based on the multi-source data includes the following steps 101 to 107.

In step 101, multi-spectral images of a rice field at different growth stages are obtained.

The step 101 specifically includes the following sub-steps.

Remote sensing images of the rice field at different growth stages are obtained by an UAV equipped with a multi-spectral camera.

A plurality of the remote sensing images are stitched to obtain a multi-spectral image of the whole rice field.

In step 102, severity of the rice bacterial blight and accumulated temperature data in the rice field at different growth stages are obtained.

The step 102 specifically includes the following sub-steps.

The disease severity of the bacterial blight in each plot is determined according to a proportion of an incidence area of the rice bacterial blight in a total area of each plot. Specifically, on the day when the UAV acquires the remote sensing image, field investigation is conducted to record a real score of the disease severity of the rice bacterial blight in the field.

The proportion of the incidence area in the total area is recorded as R.

When R is 0, rice is healthy without bacterial blight. When $0<R<=10\%$, the disease severity is level 1. When $10\%<R<=25\%$, the disease severity is level 2. When $25\%<R<=50\%$, the disease severity is level 3. When $50\%<R<=75\%$, the disease severity is level 4. When $75\%<R<=100\%$, the disease severity is level 5.

Maximum and minimum temperatures of each plot on a day when the multi-spectral images are obtained are recorded, and the accumulated temperature data of each plot is calculated through an accumulated temperature formula.

The accumulated temperature formula is $AT=\Sigma_t^e T_{mean}$, where AT is the accumulated temperature data of the day when the UAV acquires the remote sensing images, n is a number of days on which unmanned flight mission is performed (a number of days when the remote sensing images are acquired), and $T_{mean}$ is a mean of the daily maximum and minimum temperatures.

In step 103, resistances of rice varieties planted in the rice field to the bacterial blight are obtained.

The resistances of the rice varieties to the bacterial blight disease include high resistance, resistance, medium resistance, high sensitivity, sensitivity, and medium sensitivity.

In step 104, a mean canopy spectral reflectance of each plot in the rice field is extracted based on the multi-spectral images. The rice field is divided into a plurality of plots.

The step 104 specifically includes the following sub-steps.

A background of the multi-spectral image of the rice field are removed using a threshold segmentation method.

The removing backgrounds of the multi-spectral images of the rice field using a threshold segmentation method specifically includes the following sub-steps.

A segmentation threshold is determined according to a difference between the background and rice canopy reflectances.

Backgrounds of the multi-spectral images are removed using the segmentation threshold to obtain the multi-spectral data of each plot in the rice field.

The mean canopy spectral reflectance of each plot is extracted from the multi-spectral images of each plot with the backgrounds removed.

In step 105, regression is performed on the severity of the rice bacterial blight by using a convolutional neural network based on the mean canopy spectral reflectance and the severity of the rice bacterial blight corresponding to each plot, and depth spectrum feature is output.

The convolutional neural network contains an attention mechanism module. After the mean canopy spectrum is input, the attention mechanism module is configured to output a weight of each wavelength in the depth spectrum feature.

An optimal band combination for monitoring the rice bacterial blight in the field is selected based on the weight of a band output by the attention mechanism module in the convolutional neural network model.

An optimal band combination is output using the attention mechanism module in the convolutional neural network. The optimal band combination is a combination of wavelengths corresponding to first N wavelength weights in a sequence obtained by sorting wavelength weights outputted by the attention mechanism module from large to small.

A monitoring SI of the rice bacterial blight is constructed according to the optimal band combination.

A monitoring SI of the rice bacterial blight in a to-be-monitored rice field is obtained, and the monitoring SI of the rice bacterial blight in the to-be-monitored rice field is mapped into the multi-spectral image to obtain a visual image of the severity of the rice bacterial blight in the to-be-monitored rice field.

In step 106, a disease severity regression model is trained with the accumulated temperature data, the depth spectrum feature, and the resistance to the bacterial blight corresponding to each plot as an input and the corresponding severity of the rice bacterial blight as an output, to obtain a well-trained disease severity regression model.

The disease severity regression model is a PLSR model.

In step 107, the severity of rice bacterial blight in the to-be-monitored rice field is monitored using the well-trained disease severity regression model.

The present disclosure had the following technical effects:

(1) The UAV multi-spectral data, field accumulated temperature data, and resistance information of the rice varieties to the bacterial blight are fused to realize stable monitoring of the rice bacterial blight across different growth stages, which is conducive to improving the reliability of disease monitoring. (2) The field disease distribution map is drawn based on the constructed SI to provide technical support for accurate monitoring of rice diseases in the field.

Embodiment II (1) UAV Multi-Spectral Data Acquisition

With the rice experimental base of Longyou County, Quzhou City, Zhejiang Province as an example, the embodiment is described now. The field is divided into 60 plots, each plot with an area of 10.6 m×4.72 m. For any adjacent plots, each plot is planted with one rice variety, involving a total of 60 rice varieties. Different varieties had different resistances to the bacterial blight and different field resistance phenotypes. The climate of the experimental base is subtropical monsoon climate with abundant rainfall and humid air, which is suitable for rice growth. Importantly, this experimental base is an epidemic area of the bacterial blight. Such bacterial blight occurs naturally after rice planting and requires no additional treatment. Multi-spectral images are acquired by using a multi-spectral camera carried by an UAV at 25 m from the ground on the 16th, 66th and 92nd days after rice transplanting, which correspond to tillering, jointing, heading and filling stages of rice growth, respectively. The flight speed is 2.5 m/s, and fore-and-aft and lateral overlap rates are 60% and 75% respectively. The multi-spectral camera consisted of 23 wavebands with a spectral range of 600-875 nm.

(2) Data Processing

Photoscan software is used to stitch the obtained multi-spectral images of the field to form an ortho-image of the rice field, and a background is removed based on a threshold segmentation method. With the threshold segmentation method, a difference between the background and rice canopy reflectances is the largest at 675 nm. After the background is removed, multi-spectral reflectance information of the rice canopy in the field can be extracted. The multi-spectral reflectances of various plots is extracted to calculate a mean value, which represents the reflectance data of the plot.

(3) Obtaining of Real Disease Severity of Each Plot in Field

On the day after the UAV flight, on-the-spot investigation is conducted in the field to record a real disease severity of rice bacterial blight in the field. Specifically, the real disease severity of each plot in the field is recorded according to an evaluation standard of the severity of bacterial blight in the field in the China national standard GB/T 17980.19-2000, in which the severity varies from 1-5 levels, and healthy and uninfected ones are recorded as 0 levels.

(4) Acquisition of Accumulated Temperature Data

Maximum and minimum temperatures of each day after the rice is transplanted to the field are recorded, and the accumulated temperature data of each UAV flight day is calculated according to the accumulated temperature calculation formula.

(5) Obtaining of Rice Variety Information

Rice samples in this embodiment are provided by Zhejiang Academy of Agricultural Sciences, and the resistance information of each variety of rice to the bacterial blight is provided and recorded.

(6) Depth Spectrum Feature Extraction

The extracted mean canopy spectral reflectance for each plot is in one-to-one correspondence with the field real disease severity, the accumulated temperature data, and the resistance information of rice varieties to the bacterial blight for each plot, and a training set and a prediction set are divided according to the ratio of 8:2. The spectral data in the training set is input into a convolutional neural network model to conduct regression of the disease severity.

Figure 3:
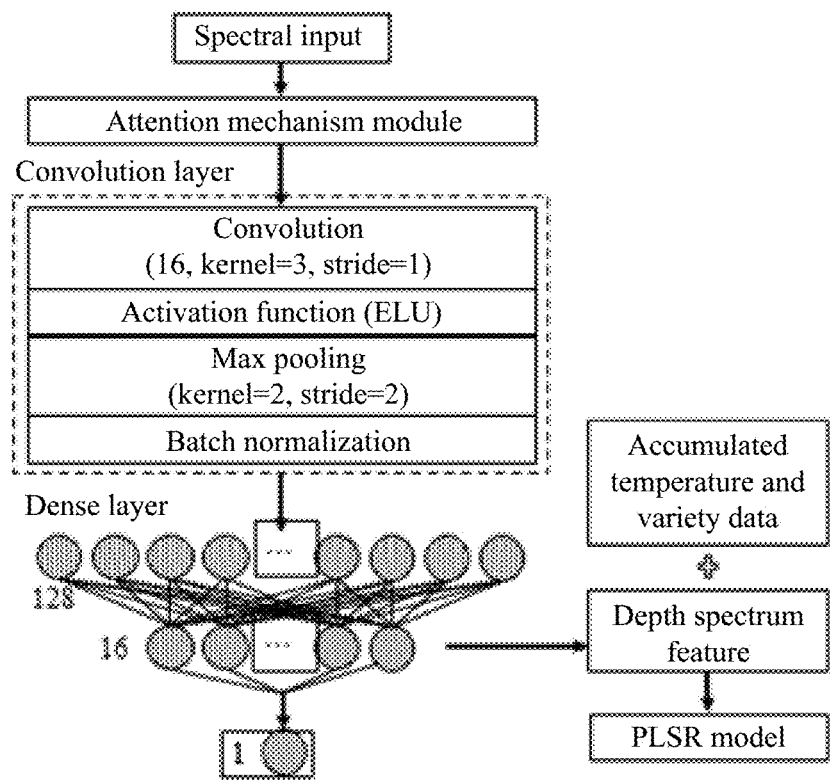
FIG. 3 is a schematic diagram of a convolutional neural network and multi-source data fusion mode according to the present disclosure.

A structure of the convolutional neural network model is shown in FIG. 3, which consists of an attention mechanism module, a convolution layer, two dense layers, and an output layer. In the convolution layer, a number of convolution kernels is 16, a size of kernel is 3, and a stride is set to 1. An exponential linear unit (ELU) activation is used as the activation function, and a max pooling layer is connected. Neural nodes of the two dense layers are 128 and 16 respectively. ReLU is used as the activation function, and Batch normalization is added behind each layer to improve a generalization ability of the model. Finally, for the output layer, and L2loss is used as a loss function to obtain an evaluation output of the disease severity. In a training stage, batch size is 5, and a dynamic learning rate is adopted. At the beginning, a relatively large learning rate of 0.0005 is set to accelerate the training process of the first 300 epochs, and in the next 300 epochs, the learning rate is reduced to 0.00005. The early stopping strategy could be adopted for training. When $R^2$ (correlation coefficient) exceeded 0.8, the training could be stopped to output the results.

In this embodiment, the convolutional neural network model architecture is built on MXNet1.4.0, and the output of the second dense layer of the convolutional neural network model is a depth spectrum feature.

Figure 4:
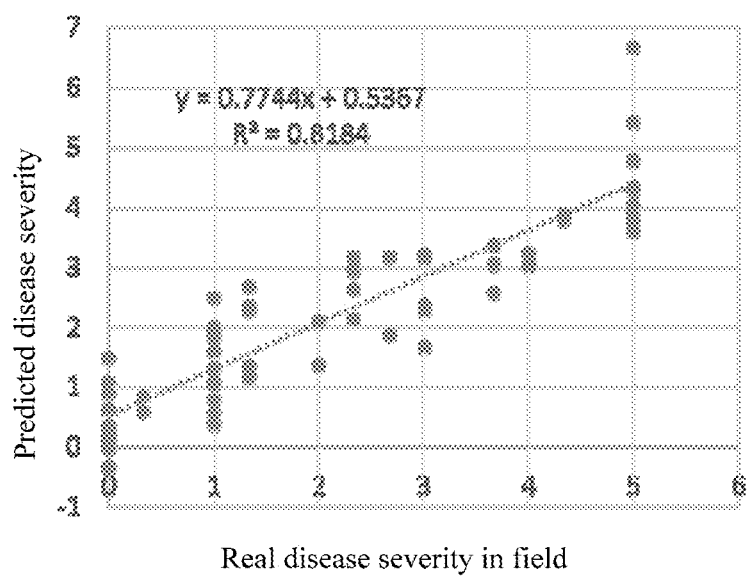
FIG. 4 is a fitting diagram of a real value and a predicted value of a prediction set when a disease severity regression model trained only with a depth spectrum feature is used to predict the bacterial blight in an example according to the present disclosure.
Figure 5:
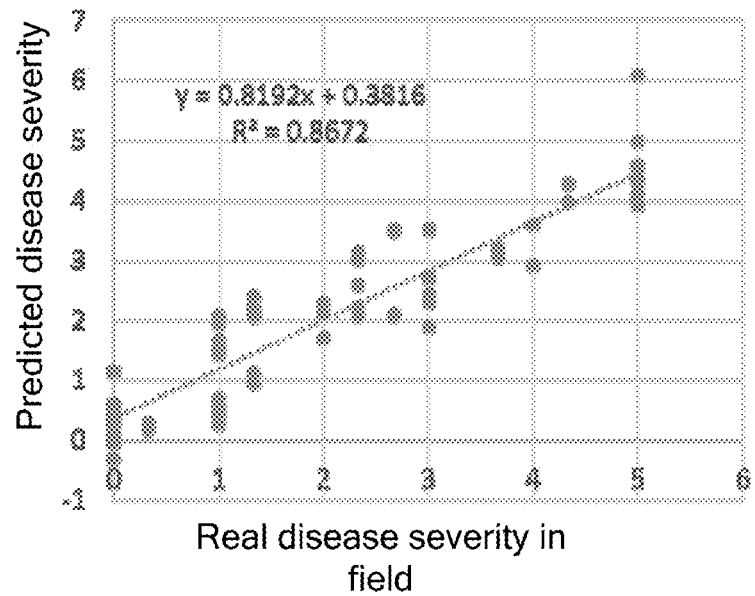
FIG. 5 is a fitting diagram of a real value and a predicted value of a prediction set when the disease severity regression model trained with multi-source data is used to predict the bacterial blight in the example according to the present disclosure.

(7) Evaluation of Severity of Rice Bacterial Blight in Field Based on Multi-Source Data By having the depth spectrum feature, the accumulated temperature data, and the resistance information of rice varieties to the bacterial blight be fused and corresponded to the real disease severity in the field, a data set is constructed. The data set is divided into a training set and a prediction set according to the ratio of 8:2, and a PLSR model is established to predict the disease severity. The PLSR model is trained with a method of leave-one-out cross-validation. Finally, the $R^2$, the root mean square error (RMSE) and the relative percent difference (RPD) of the prediction set are 0.8672, 0.63 and 2.72, respectively, indicating that the prediction result of the model is excellent. A fitting diagram of a real value and a predicted value of the prediction set is shown in FIG. 5 (modeling by fusing depth spectrum feature with accumulated temperature data and resistance information of the rice varieties to the bacterial blight). FIG. 4 shows results of the prediction set when the PLSR model established only using the depth spectrum feature predicts the disease severity, which is poorer than the method of the present disclosure.

(8) Determination of Optimal Band Combination

Figure 6:
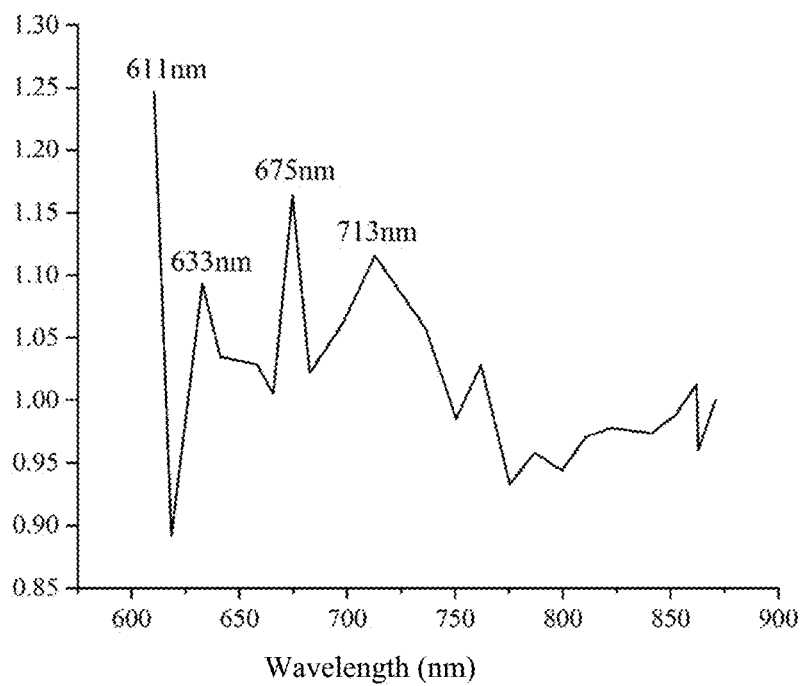
FIG. 6 is a schematic diagram of a selected optimal band combination and its corresponding weight in the example according to the present disclosure.

In this embodiment, the convolutional neural network model deeply studies the feature information in multi-spectral data of rice layer by layer through the convolutional layer and the dense layer. The attention mechanism module allows the network pay more attention to important areas in the input spectral data, so as to output the corresponding weight of each band. The weight corresponding to each band finally output is shown in FIG. 6, and the ordinate in FIG. 6 is the weight. The four bands with higher weight are selected as an optimal band combinations, which are 611 nm, 675 nm, 713 nm and 633 nm in sequence.

(9) Construction of Monitoring SI of Rice Bacterial Blight in Field

The weights corresponding to the four wavelengths in the optimal band combinations are 1.25, 1.16, 1.12 and 1.09 respectively, so as to construct the monitoring SI of the rice bacterial blight in the field. A calculation formula of SI is as follows:

$$SI=1.25R_{611}+1.16R_{675}+1.12R_{713}+1.09R_{633},$$

where $R_{611}$, $R_{675}$, $R_{713}$, and $R_{633}$ represent the corresponding spectral reflectances at the wavelengths of 611 nm, 675 nm, 713 nm and 633 nm respectively.

(10) Visualization of Severity of Rice Bacterial Blight in Field

Figure 7:
FIG. 7 shows a visualization image of an incidence severity of the rice bacterial blight in the field in the example according to the present disclosure.

In this embodiment, the constructed monitoring SI of the rice bacterial blight in the field is calculated and mapped to the multi-spectral image of the whole experimental field, and finally a visual image of the severity of the rice bacterial blight in the field is obtained, as shown in FIG. 7.

Embodiment III

Figure 8:
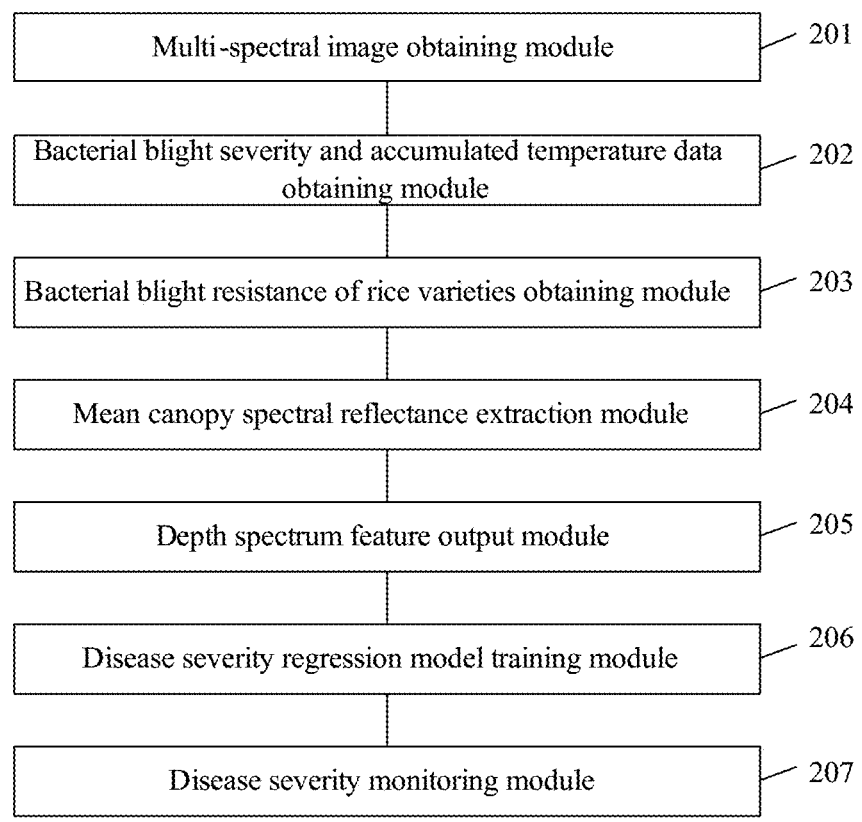
FIG. 8 is a schematic structural diagram of a system for monitoring rice bacterial blight in a field based on multi-source data according to the present disclosure.

FIG. 8 is a schematic structural diagram of a system for monitoring rice bacterial blight in a field based on multi-source data of the present disclosure. As shown in FIG. 8, the system for monitoring rice bacterial blight in a field based on multi-source data includes: a multi-spectral image obtaining module 201, a bacterial blight severity and accumulated temperature data obtaining module 202, a bacterial blight resistance of rice varieties obtaining module 203, a mean canopy spectral reflectance extraction module 204, a depth spectrum feature output module 205, a disease severity regression model training module 206, and a disease severity monitoring module 207.

The multi-spectral image obtaining module 201 is configured to obtain a multi-spectral image of a rice field at different growth stages.

The bacterial blight severity and accumulated temperature data obtaining module 202 is configured to obtain severities of the rice bacterial blight and accumulated temperature data in the rice field at different growth stages.

The bacterial blight resistance of rice varieties obtaining module 203 is configured to obtain resistance of rice varieties planted in the rice field to the bacterial blight.

The mean canopy spectral reflectance extraction module 204 is configured to extract a mean canopy spectral reflectance of each plot in the rice field based on the multi-spectral images. The rice field is divided into a plurality of plots.

The depth spectrum feature output module 205 is configured to conduct regression of the severity of the rice bacterial blight using a convolutional neural network based on the mean canopy spectral reflectance and the severity of the rice bacterial blight corresponding to each plot, and output depth spectrum feature.

The disease severity regression model training module 206 is configured to train a disease severity regression model by taking accumulated temperature data, the depth spectrum feature, and resistance to the bacterial blight corresponding to each plot as an input and the corresponding severity of the rice bacterial blight as an output to obtain a well-trained disease severity regression model.

The disease severity regression model is a PLSR model.

The disease severity monitoring module 207 is configured to monitor the severity of the rice bacterial blight in a to-be-monitored rice field using the well-trained disease severity regression model.

The system for monitoring rice bacterial blight in afield based on multi-source data further includes: an optimal band combination determination module, a rice bacterial blight monitoring SI construction module, and a visual image determination module for the severity of the rice bacterial blight.

The optimal band combination determination module is configured to output an optimal band combination using an attention mechanism module in the convolutional neural network. The optimal band combination is a combination of wavelengths corresponding to first N terms in a sequence obtained by wavelength weights outputted by the attention mechanism module from large to small.

The rice bacterial blight monitoring SI construction module is configured to construct a monitoring SI of the rice bacterial blight according to the optimal band combination.

The visual image determination module for the severity of the rice bacterial blight is configured to obtain a monitoring SI of the rice bacterial blight in the to-be-monitored rice field, and map the monitoring SI of the rice bacterial blight in the to-be-monitored rice field into the multi-spectral image to obtain a visual image of the severity of the rice bacterial blight in the to-be-monitored rice field.

The multi-spectral image obtaining module 201 specifically includes: a remote sensing image obtaining unit and an image stitching unit.

The remote sensing image obtaining unit is configured to obtain remote sensing images of the rice field at different growth stages by an UAV equipped with a multi-spectral camera.

The image stitching unit is configured to stitch a plurality of the remote sensing images to obtain a multi-spectral image of the whole rice field.

The bacterial blight severity and accumulated temperature data obtaining module 202 specifically includes: a bacterial blight severity determination unit and an accumulated temperature data determination unit.

The bacterial blight severity determination unit is configured to determine the severity of the rice bacterial blight in each plot according to a proportion of an incidence area of the rice bacterial blight in a total area of each plot.

The accumulated temperature data determination unit is configured to record maximum and minimum temperatures of each plot on a day when the multi-spectral image is obtained, and calculate the accumulated temperature data of each plot through an accumulated temperature formula.

The mean canopy spectral reflectance extraction module 204 is specifically configured to conduct the following operations:
    removing a background of the multi-spectral image of the rice field using a threshold segmentation method; and
    extracting the mean canopy spectral reflectance of each plot from the multi-spectral image of each plot with the background removed.

Each embodiment of the present specification is described in a progressive manner, each embodiment focuses on the difference from other embodiments, and the same and similar parts between the embodiments may refer to each other. Since the system disclosed in an embodiment corresponds to the method disclosed in another embodiment, the description is relatively simple, and reference can be made to the method description.

Specific embodiments are used herein to explain the principles and implementations of the present disclosure. The foregoing description of the embodiments is merely intended to help understand the method of the present disclosure and its core ideas; besides, various modifications may be made by those of ordinary skill in the art to specific implementations and the scope of application in accordance with the ideas of the present disclosure. In conclusion, the content of the present specification shall not be construed as limitations to the present disclosure.

What is claimed is:

1. A method for monitoring rice bacterial blight in a field based on multi-source data, comprising:
    obtaining a multi-spectral image of a rice field at different growth stages;
    obtaining severities of the rice bacterial blight and accumulated temperature data in the rice field at different growth stages;
    obtaining resistance of rice varieties planted in the rice field to the bacterial blight;
    extracting a mean canopy spectral reflectance of each plot in the rice field based on the multi-spectral image, wherein the rice field is divided into a plurality of plots;
    conducting regression of the severity of the rice bacterial blight using a convolutional neural network based on the mean canopy spectral reflectance and the severity of the rice bacterial blight for each plot, and outputting a depth spectrum feature;
    training a disease severity regression model with the accumulated temperature data, the depth spectrum feature, and the resistance to the bacterial blight for each plot as an input and the corresponding severity of the rice bacterial blight as an output to obtain a well-trained disease severity regression model; and
    inputting accumulated temperature data, a depth spectrum feature and resistance to the bacterial blight corresponding to each plot of a to-be-monitored rice field into the well-trained disease severity regression model to output a level of severity of the rice bacterial blight in the to-be-monitored rice field.

2. The method according to claim 1, further comprising:
    outputting an optimal band combination using an attention mechanism module in the convolutional neural network, wherein the optimal band combination is a combination of wavelengths corresponding to first N terms in a sequence obtained by sorting wavelength weights outputted by the attention mechanism module from large to small;
    constructing a monitoring spectral index (SI) of the rice bacterial blight according to the optimal band combination; and
    obtaining a monitoring SI of the rice bacterial blight in the to-be-monitored rice field, and mapping the monitoring SI of the rice bacterial blight in the to-be-monitored rice field into the multi-spectral image to obtain a visual image of the severity of the rice bacterial blight in the to-be-monitored rice field.

3. The method according to claim 1, wherein the obtaining multi-spectral image of a rice field at different growth stages specifically comprises:
    obtaining remote sensing images of the rice field at different growth stages by an unmanned aerial vehicle (UAV) equipped with a multi-spectral camera; and
    stitching a plurality of the remote sensing images to obtain the multi-spectral image of the rice field as a whole.

4. The method according to claim 1, wherein the obtaining severities of the rice bacterial blight and accumulated temperature data in the rice field at different growth stages comprises:
    determining the severity of the rice bacterial blight in each plot according to a proportion of an incidence area of the rice bacterial blight in a total area of each plot; and
    recording maximum and minimum temperatures of each plot on a day when the multi-spectral image is obtained, and calculating the accumulated temperature data of each plot through an accumulated temperature formula.

5. The method according to claim 1, wherein the extracting a mean canopy spectral reflectance of each plot in the rice field based on the multi-spectral image comprises:
    removing a background of the multi-spectral image of the rice field using a threshold segmentation method; and
    extracting the mean canopy spectral reflectance of each plot from the multi-spectral image with the background removed.

6. The method according to claim 1, wherein the disease severity regression model is a partial least square regression (PLSR) model.

7. A system for monitoring rice bacterial blight in a field based on multi-source data, comprising:
    a multi-spectral image obtaining module, configured to obtain a multi-spectral image of a rice field at different growth stages;
    a bacterial blight severity and accumulated temperature data obtaining module, configured to obtain severities of the rice bacterial blight and accumulated temperature data in the rice field at different growth stages;
    a bacterial blight resistance of rice varieties obtaining module, configured to obtain resistance of the rice varieties planted in the rice field to the bacterial blight;
    a mean canopy spectral reflectance extraction module, configured to extract a mean canopy spectral reflectance of each plot in the rice field based on the multi-spectral images, wherein the rice field is divided into a plurality of plots;
    a depth spectrum feature output module, configured to conduct regression of the severity of the rice bacterial blight using a convolutional neural network based on the mean canopy spectral reflectance and the severity of the rice bacterial blight for each plot, and output a depth spectrum feature;
    a disease severity regression model training module, configured to train a disease severity regression model with the accumulated temperature data, the depth spectrum feature, and the resistance to the bacterial blight for each plot as an input and the corresponding severity of the rice bacterial blight as an output to obtain a well-trained disease severity regression model; and
    a disease severity monitoring module, configured to input accumulated temperature data, a depth spectrum feature and resistance to the bacterial blight corresponding to each plot of a to-be-monitored rice field into the well-trained disease severity regression model to output a level of severity of the rice bacterial blight in the to-be-monitored rice field.

8. The system according to claim 7, further comprising:
    an optimal band combination determination module, configured to output an optimal band combination using an attention mechanism module in the convolutional neural network, wherein the optimal band combination is a combination of wavelengths corresponding to first N terms in a sequence obtained by sorting wavelength weights outputted by the attention mechanism module from large to small;

a rice bacterial blight monitoring SI construction module, configured to construct a monitoring SI of the rice bacterial blight according to the optimal band combination; and a visual image determination module for the severity of the rice bacterial blight, configured to obtain a monitoring SI of the rice bacterial blight in the to-be-monitored rice field, and map the monitoring SI of the rice bacterial blight in the to-be-monitored rice field into the multi-spectral image to obtain a visual image of the severity of the rice bacterial blight in the to-be-monitored rice field.

9. The system according to claim 7, wherein the multi-spectral image obtaining module comprises:

a remote sensing image obtaining unit, configured to obtain remote sensing images of the rice field at different growth stages by an UAV equipped with a multi-spectral camera; and an image stitching unit, configured to stitch a plurality of the remote sensing images to obtain the multi-spectral image of the rice field as a whole.

10. The system according to claim 7, wherein the bacterial blight severity and accumulated temperature data obtaining module comprises:

a bacterial blight severity determination unit, configured to determine the severity of the rice bacterial blight in each plot according to a proportion of an incidence area of the rice bacterial blight in a total area of each plot; and an accumulated temperature data determination unit, configured to record maximum and minimum temperatures of each plot on a day when the multi-spectral image is obtained, and calculate the accumulated temperature data of each plot through an accumulated temperature formula.

* * * * *